United States Patent [19]

Harjar

[11] 4,348,040
[45] Sep. 7, 1982

[54] FLANGED PIPE FITTING
[75] Inventor: Martin J. Harjar, Vermilion, Ohio
[73] Assignee: Nordson Corporation, Amherst, Ohio
[21] Appl. No.: 215,262
[22] Filed: Dec. 11, 1980
[51] Int. Cl.³ .............................................. F16L 55/00
[52] U.S. Cl. .................................... 285/175; 285/179;
285/356; 285/423; 285/DIG. 22
[58] Field of Search ................... 285/DIG. 22, 33, 34,
285/35, 322, 353, 356, 175, 384, 179, 387, 423;
239/3, 690, 707

[56] References Cited

U.S. PATENT DOCUMENTS

| 998,587 | 7/1911 | Mueller . | |
|---|---|---|---|
| 2,971,780 | 2/1961 | Bauer | 285/356 X |
| 3,092,404 | 6/1963 | MacWilliam | 285/334.4 |
| 3,345,084 | 10/1967 | Hanes et al. | 285/34 X |
| 3,679,237 | 7/1972 | DeAngelis | 285/353 |
| 3,747,850 | 7/1973 | Hastings et al. | 239/3 |
| 4,126,338 | 11/1978 | Coel | 285/423 |

FOREIGN PATENT DOCUMENTS

| 572184 | 1/1976 | Switzerland | 285/322 |
|---|---|---|---|
| 1174948 | 12/1969 | United Kingdom | 285/353 |

Primary Examiner—Dave W. Arola
Attorney, Agent, or Firm—Wood, Herron & Evans

[57] ABSTRACT

A two-piece pipe fitting is disclosed for establishing a sealed connection between a pipe or fluid conduit and a connector body in the form of an electrostatic spray gun. The fitting comprises a flanged tube element and a threaded sleeve nut surrounding the tube element. The sleeve nut, when threaded into a threaded section of a bore in the connector body, forces the flange of the tube element into the bore so as to establish a sealed connection between the bore and the flanged end of the tube element.

19 Claims, 5 Drawing Figures

U.S. Patent  Sep. 7, 1982  4,348,040
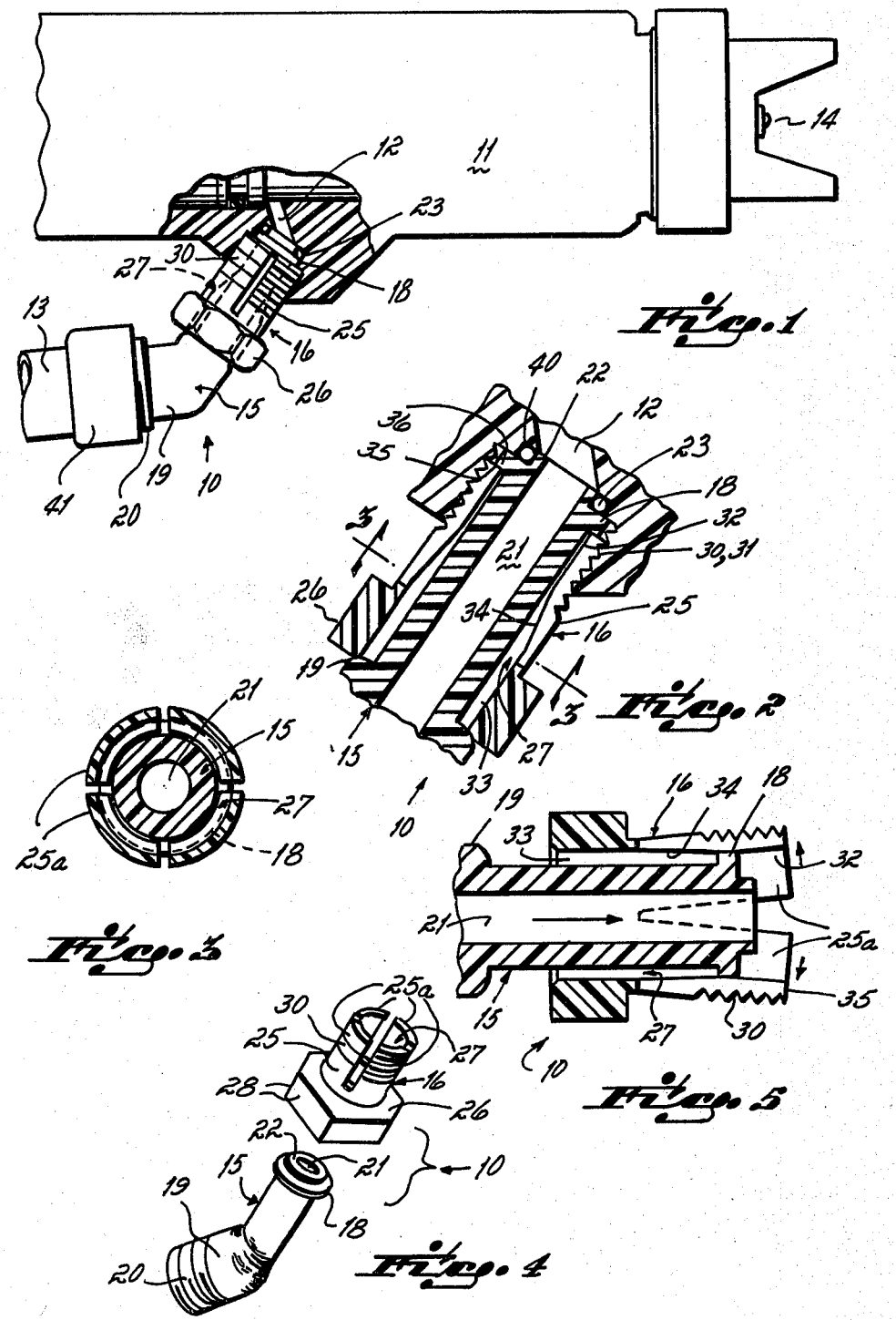

FLANGED PIPE FITTING

This invention relates to pipe fitting and more particularly to a fitting for connecting a hose or pipe to a connector body such as a liquid dispensing electrostatic spray gun.

In the past, pipes or hoses have commonly been sealingly attached to connector bodies by pipe threads formed on the end of the pipe or hose. These pipe threads are tapered so that when threaded into a bore of the connector body, the threads form a seal between the pipe and the bore of the connector body. An example of such a connector may be found in U.S. Pat. No. 3,747,850.

Pipe threaded sealed connections are limited in application to situations in which the angular orientation of the pipe relative to the connector body is not critical or is not required to be variable. If the angular orientation of the pipe is critical or is required to be adjustable, then some other type of sealed connector has been required.

One type of sealed connector which has been used in the past for making a sealed connection between a pipe and a connector body where the angular orientation of the pipes was critical or was required to be varied, employed a flange on the end of the pipe and a nut surrounding the pipe and threaded into a bore of the connector body so as to force the flange into sealed contact with the connector body. Such a flange type fitting or connector is disclosed in U.S. Pat. No. 3,092,404.

The use of a nut surrounding the pipe and threaded into the connector body to force a flange on the pipe into sealed engagement with the connector body is generally limited to applications where the nut can be slipped over the pipe, as in U.S. Pat. No. 3,092,404, or where the pipe flange can be conveniently formed on the pipe after the surrounding nut has been placed thereon. This later approach involves flaring or swaging the end of the pipe after the nut is placed thereon as in U.S. Pat. No. 998,587. Often though, it is not convenient or practical to either fit the nut onto the pipe after forming of the flange or to flare the end of the pipe after placement of the nut onto the pipe. In that event, some other form of fitting has heretofore been required to be found to make the sealed connection with the connector body.

If has been an objective of this invention to provide an improved flange type pipe fitting for sealingly securing a flanged pipe to a connector body. This improved fitting enables a tube having a flange on one end to be connected to a connector body by a threaded nut even though the nut cannot be slipped onto the tube from the end opposite the flange and even though the flange cannot conveniently be flared or swaged onto the tube after placement of the nut thereon.

Still another objective of this invention has been to provide an improved non-metallic flange type pipe fitting for use in an electrostatic spray gun. Electrostatic spray guns are commonly used in an explosive environment where a spark could result in an explosion. Therefore, this flange type fitting is of non-metalic construction so as not to be capable of storing an electrical charge and acting as a capacitor to discharge an electrical spark if accidently grounded.

Still another objective of this invention has been to provide an improved flange type fitting for use in combination with an electrostatic spray gun which enables the gun to be used in tight areas where the liquid supply hose or conduit must extend generally parallel to the gun body and wherein a minimum offset must be provided between the gun body and the supply hose.

Oftentimes, electrostatic spray guns, and particularly automatically activated electrostatic spray guns, are used in situations where there is a minimum clearance for the spray gun. In those situations, the hose has heretofore been connected to the gun by a right angle hose fitting so as to locate the supply hose parallel to and immediately against the side of the spray gun. But when so connected, the right angle fitting has the effect of creating an undesirable pressure drop between the liquid supply to the gun and the liquid contained in the gun. In many situations and particularly when spraying relatively viscous liquids, such a pressure drop has a deletarious effect on the spray pattern emerging from the spray gun. Therefore, it has been another objective of this invention to provide an improved pipe fitting for use with electrostatic spray guns which minimizes pressure drop within the fitting.

The improved pipe fitting of this invention which accomplishes these objectives comprises a flanged tube element and a threaded sleeve nut surrounding the tube element. The tube element has a 45° bend or elbow formed therein. A flange is formed on one end of the tube element and the opposite end is so configured that the sleeve nut cannot be fitted over the tube element from the end remote from the flange. The internal diameter of the sleeve nut is smaller than the external diameter of the flange of the tube element in order that the sleeve nut will engage the flange of the tube element when the sleeve nut is threaded into the connector body and force the flanged end of the tube element into sealed engagement with a bore of the connector body. In order to locate the threaded sleeve nut over the pipe element the threaded portion of the sleeve nut is longitudinally split so that the small internal diameter bore of the sleeve nut may be radially expanded and forced over the flange of the tube element. Once placed over the pipe element, the threaded sleeve nut may then be threaded into the threaded bore of the connector body so as to force the flanged end of the tubular element into sealed engagement with the bore of the connector body.

The primary advantage of this invention is that it enables a flanged pipe or conduit to be conveniently and quickly connected to a connector body or electrostatic spray gun body by a simple two-piece fitting which may be conveniently molded and assembled without the need for special tools to flare or expand the end of the pipe or conduit. Additionally, this invention enables a pipe fitting to be made from low capacitance plastic materials which cannot be conveniently flared or swaged.

These and other objects and advantages of this invention will be more readily apparent from the foregoing description of the drawings in which:

FIG. 1 is a side elevational view of the pipe fitting of this invention illustrating the manner in which it is attached to a connector body.

FIG. 2 is a cross sectional view taken through a portion of the pipe fitting of FIG. 1.

FIG. 3 is a cross sectional view taken along line 3—3 of FIG. 2.

FIG. 4 is an exploded perspective view of the pipe fitting illustrated in FIG. 1.

FIG. 5 is a cross sectional view through the end portion of the pipe fitting illustrating the manner in which the threaded sleeve nut of the fitting is mounted upon the tube element of the fitting.

Referring first to FIG. 1, the pipe fitting 10 of this invention is illustrated as attached to a connector body 11. In the illustrated embodiment, the connector body 11 is a liquid dispensing electrostatic spray gun having a conduit 12 therein through which liquid supplied by a pipe 13 through the pipe fitting 10 may flow into the gun to be dispensed through an orifice of a spray nozzle 14. The connector body 11 is conventional and is the subject of U.S. Pat. No. 3,747,850. For purposes of completing the disclosure of this application, the disclosure of this patent is hereby incorporated by reference.

The connector body 11 is made from a plastic material so as to be of low capacitance. Per se the connector body or dispenser 11 forms no part of the invention of this application but has only been illustrated as being representative of the type of connector body to which the pipe fitting 10 of this invention may be attached so as to form a sealed liquid flow conduit from an inlet pipe to a flow passage within the connector body.

The pipe fitting 10 of this invention is best illustrated in FIG. 4. As may be seen in this figure, this fitting comprises a molded tube element 15 and a threaded sleeve nut 16. In the preferred embodiment, both of these elements are molded from a plastic material such as nylon.

The molded tube element 15 comprises a tubular section which has a flange 18 formed adjacent one end. On its other end this tube element has an enlarged end section 19 within which there is a 45° angular bend. The outer end of the enlarged end section 19 is externally threaded as illustrated at 20. An axial passage 21 extends through the tube element 15 for the full length of the element. There is a lip 22 which extends forwardly from the tubular element around the passage 21. As it is explained more fully hereinafter, this lip 22 serves as a seat for an O-ring seal 23 which, when the fitting is assembled to a connector body 11, forms a liquid tight seal between the connector body and the fitting.

The tube element 15 is secured to the connector body 11 by the threaded sleeve nut 16. This sleeve nut 16 comprises a tubular body section 25 and a nut section 26. An axial bore 27 extends through both the body section 25 and the nut section 26 of the sleeve nut 16. The periphery of the nut section has a regular hexagonal shape with six flats 28 formed thereon so that it may be gripped and turned by a conventional tool such as an open end wrench.

The body section 25 of the sleeve nut extends forwardly from the front face of the nut section 26. On its outer end, the body section of the sleeve nut 16 has male threads 30 formed thereon such that the sleeve nut may be threaded into female threads 31 machined or formed in the bore 12 of the connector body 11. There are four longitudinal slots 29 which extend for the full length of the body section 25 of the sleeve nut. As explained more fully hereinafter, these longitudinal slots 29 enable the body section of the sleeve nut to be expanded so that the sleeve nut may be forced over the flange 18 of the tube element 15.

With particular reference to FIG. 2, it will be noted that the bore 27 of the sleeve nut is of varying diameter along the length of the nut 16. Specifically, the bore 27 is of smaller diameter in the outer threaded end of the body section 25 and is of larger diameter in the section of the bore located internally of the nut section 26. The small diameter section 32 of the bore is interconnected with the large diameter section 33 by a tapered section 34. The small diameter section 32 is smaller in diameter than the external diameter of the flange 18, while the large diameter section 33 is larger in diameter than the flange 33. Consequently, as illustrated in FIG. 5, the large diameter section 33 of the bore 27 may be slipped over the flanged end of the tube element 15 and, by the application of axial pressure on the sleeve nut 16, the split smaller diameter section of the sleeve nut may be forced over the flange 18 against the resilience of the split body section 25 by spreading the split end sections 25a of the sleeve nut and forcing those split sections 25a radially outwardly. After the small diameter section 32 of the bore 27 of the split nut has been forced over the flange 18, the inherent resiliency of the material of which the sleeve nut is made causes the sleeve nut to return to its original shape as illustrated in FIG. 2 wherein the end surface 35 of the sleeve nut abuts the shoulder 36 of the flange 18.

It is necessary to position the sleeve nut on the tube element 15 by sliding the sleeve nut over the flange 18 because the opposite end of the tube element 15 remote from the flange 18 is of substantially larger diameter than any portion of the bore 27 in the sleeve nut.

In the use of the pipe fitting 10 of this invention, the sleeve nut 16 is mounted upon the tube element 15 in the manner heretofore described by sliding the nut section 26 over the flange 18 of the tube element and then forcing the split threaded end of the sleeve nut over the flange even though the bore 32 of this section of the nut is smaller in diameter than the external diameter of the flange. When thus forced over the end of the tube element, the end 35 of the sleeve nut abuts the shoulder 36 of the flange 18. An O-ring seal 23 is then placed over the hub 22 of the tube element and the assembled tube element and sleeve nut 16 inserted into the threaded section 31 of the bore 12 within the connector body. When the threaded sleeve nut 16 is then rotated, the male threads of the sleeve nut thread into the threaded section 31 of the bore 13 so as to move the sleeve nut and flanged tube element inwardly into the bore 12 until the O-ring seal 23 contacts and is compressed between the flange 18 of the tube element 15 and a shoulder 40 of the bore 12. When so compressed, the O-ring seal 23 forms a liquid tight seal between the bore of the connector body and the tube element 15 of the pipe fitting 10.

After attachment of the pipe fitting 10 to the connector body 11, the end of the pipe fitting 10 remote from the connector body, may be attached by any conventional type of fitting to a pipe 13 or any other type of conduit through which liquid is to be supplied through the pipe fitting 10 into the connector body. In the preferred embodiment illustrated in FIG. 1, the pipe 13 is connected to the threaded end 20 of a tube element 15 by a conventional sleeve type coupling 41 having internal threads threaded onto the external threads 20 of the end 19 of the tube element 15.

The primary advantage of this invention is that it enables a pipe or conduit to be connected to a connector body by a fitting which may be molded of plastic and easily snap assembled without the need for a special tool to flare or expand the end of the fitting. Because the fitting is made of plastic material, it is of low capacitance and may be safely used in an electrostatic spray environment without creating a dangerous spark potential. Additionally, this fitting has the advantage when used in combination with an electrostatic spray gun of minimizing pressure drop between a pressurized source of liquid supplied to the gun via the fitting and the interior of the gun.

While I have described only a single preferred embodiment of my invention, persons skilled in the art to which this invention pertains will readily appreciate numerous changes and modifications which may be made without departing from the spirit of my invention. Therefore, I do not intend to be limited except by the scope of the following appended claims.

I claim:

1. A two-piece pipe fitting adapted to be secured to a connector body, said fitting comprising
   a tube element having a radial flange adjacent one end of the element, and a section of substantially larger external dimension than the external diameter of said radial flange formed on the end of said tube opposite from said one end, and
   a unitary threaded sleeve nut surrounding said tube element, said threaded sleeve nut having a generally tubular body section formed on one end and a circumferentially continuous nut section formed on the other end, said tubular body section being longitudinally split and having male threads formed thereon,
   said one end of said threaded sleeve nut having an internal diameter less than the diameter of said radial flange of said tube element and said other end of said threaded sleeve nut having an internal diameter larger than the external diameter of said radial flange of said tube element, said threaded sleeve nut being positioned over said tube element by forcing the split tubular body section over said radial flange of said tube element while radially expanding the split tubular body section of said sleeve nut, and said threaded sleeve nut being retained on said tube element by engagement of an end surface of said split tubular body section of said sleeve nut with said radial flange of said tubular element.

2. The pipe fitting of claim 1 in which said opposite end of said tube element has a threaded section formed thereon for attachment to another threaded element.

3. The pipe fitting of claim 1 in which said tube element is molded from plastic.

4. A two-piece pipe fitting adapted to be secured to a connector body, said fitting comprising
   a tube element having a radial flange adjacent one end of the element, and a section of substantially larger external dimension than the external diameter of said radial flange formed on the end of said tube opposite from said one end, and
   a unitary threaded sleeve nut surrounding said tube element, said threaded sleeve nut having a generally tubular body section formed on one end and a circumferentially continuous nut section formed on the other end, said tubular body section being longitudinally split and having male threads formed thereon,
   said threaded sleeve nut having an axial bore extending through said sleeve nut, said bore being of an internal diameter less than the diameter of said radial flange of said tube element within said tubular body section and being of an internal diameter larger than the external diameter of said radial flange of said tube element within said nut section, said threaded sleeve nut being positioned over said tube element by forcing the split tubular body section against the resiliency of said split tubular body section over said radial flange of said tube element while radially expanding the split tubular body section of said sleeve nut, and said threaded sleeve nut being retained on said tube element by engagement of an end surface of said split tubular body section of said sleeve nut with said radial flange of said tubular element.

5. The pipe fitting of claim 4 in which said opposite end of said tube element has a threaded section formed thereon for attachment to another threaded element.

6. A two-piece pipe fitting in combination with a connector body, said connector body having a bore therein, said bore terminating in a section having female threads therein,
   said fitting comprising
   a tube element having a radial flange adjacent one end of the element, and a section of substantially larger external dimension than the external diameter of said radial flange formed on the end of said tube opposite from said one end, and
   a unitary threaded sleeve nut surrounding said tube element, said threaded sleeve nut having a generally tubular body section formed on on end and a circumferentially continuous nut section formed on the other end, said tubular body section being longitudinally split and having male threads formed thereon, said male threads of said sleeve nut being threaded into said female threads of said connector body,
   said threaded sleeve nut having an axial bore extending through said sleeve nut, said bore being of an internal diameter less than the diameter of said radial flange of said tube element within said tubular body section and being of an internal diameter larger than the external diameter of said radial flange of said tube element within said nut section, said threaded sleeve nut being positioned over said tube element by forcing the split tubular body section against the resiliency of said split tubular body section over said radial flange of said tube element while radially expanding the tubular body section of said sleeve nut, and said threaded sleeve nut being retained on said tube element by engagement of an end surface of said split tubular body section of said sleeve nut with said radial flange of said tubular element.

7. The combination of claim 6 in which said opposite end of said tube element has a threaded section formed thereon for attachment to another threaded fitting.

8. The combination of claim 6 which further includes a seal located between said tube element and said connector body.

9. The combination of claim 8 in which said seal is located between said flange of said tube element and said bore of said body connector.

10. In combination, an electrostatic spray gun body, and a two-piece pipe fitting, said fitting comprising
    a tube element having a radial flange adjacent one end of the element, and a section of substantially larger external dimension than the external diameter of said radial flange formed on the end of said tube opposite from said one end, and
    a unitary threaded sleeve nut surrounding said tube element, said threaded sleeve nut having a generally tubular body section formed on one end and a circumferentially continuous nut section formed on the other end, said tubular body section being longitudinally split and having male threads formed thereon, said one end of said threaded sleeve nut having an internal diameter less than the diameter of said radial flange of said tube element and said other end of said threaded sleeve nut having an internal diameter larger than the external diameter of said radial flange of said tube element, said threaded sleeve nut being positioned over said tube element by forcing the split tubular body section over said radial flange of said tube element while radially expanding the split tubular body section of said sleeve nut, and said threaded sleeve nut being retained on said tube element by engagement of an end surface of said split tubular body section of said sleeve nut with said radial flange of said tubular element.

11. The combination of claim 10 in which said opposite end of said tube element has a threaded section formed thereon for attachment to another threaded element.

12. The combination of claim 10 in which said tube element is molded from plastic.

13. The combination of claim 12 in which said tube element has a 45° elbow formed therein between said one end and said opposite end.

14. In combination, an electrostatic spray gun body and a two-piece pipe fitting secured to said body, said fitting comprising:

a tube element having a radial flange adjacent one end of the element, and a section of substantially larger external dimension than the external diameter of said radial flange formed on the end of said tube opposite from said one end, and a unitary threaded sleeve nut surrounding said tube element, said threaded sleeve nut having a generally tubular body section formed on one end and a circumferentially continuous nut section formed on the other end, said tubular body section being longitudinally split and having male threads formed thereon, said threaded sleeve nut having an axial bore extending through said sleeve nut, said bore being of an internal diameter less than the diameter of said radial flange of said tube element within said tubular body section and being of an internal diameter larger than the external diameter of said radial flange of said tube element within said nut section, said threaded sleeve nut being positioned over said tube element by forcing the split tubular body section against the resiliency of said split tubular body section over said radial flange of said tube element while radially expanding the split tubular body section of said sleeve nut, and said threaded sleeve nut being retained on said tube element by engagement of an end surface of said split tubular body section of said sleeve nut with said radial flange of said tubular element.

15. In combination, an electrostatic spray gun body and a two-piece fitting, said body having a bore therein, said bore terminating in a section having female threads therein, said fitting comprising a tube element having a radial flange adjacent one end of the element, and a section of substantially larger external dimension than the external diameter of said radial flange formed on the end of said tube opposite from said one end, and a unitary threaded sleeve nut surrounding said tube element, said threaded sleeve nut having a generally tubular body section formed on one end and a circumferentially continuous nut section formed on the other end, said tubular body section being longitudinally split and having male threads formed thereon, said male threads of said sleeve nut being threaded into said female threads of said connector body, said threaded sleeve nut having an axial bore extending through said sleeve nut, said bore being of an internal diameter less than the diameter of said radial flange of said tube element within said tubular body section and being of an internal diameter larger than the external diameter of said radial flange of said tube element within said nut section, said threaded sleeve nut being positioned over said tube element by forcing the split tubular body section against the resiliency of said split tubular body section over said radial flange of said tube element while radially expanding the tubular body section of said sleeve nut, and said threaded sleeve nut being retained on said tube element by engagement of an end surface of said split tubular body section of said sleeve nut with said radial flange of said tubular element.

16. The combination of claim 15 in which said opposite end of said tube element has a threaded section formed thereon for attachment to another threaded fitting.

17. The combination of claim 15 which further includes a seal located between said tube element and said body.

18. The combination of claim 17 in which said seal is located between said flange of said tube element and said bore of said body connector.

19. The combination of claim 15 in which said two-piece pipe fitting is made of plastic material and in which said tube element has a 45° elbow formed between said one end and said opposite end.

* * * * *